(12) United States Patent
Kai (10) Patent No.: US 7,408,467 B2
(45) Date of Patent: Aug. 5, 2008

(54) ANTENNA AND RFID TAG MOUNTING THE SAME

(75) Inventor: Manabu Kai, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 156 days.

(21) Appl. No.: 11/260,117

(22) Filed: Oct. 27, 2005

(65) Prior Publication Data

US 2007/0008134 A1    Jan. 11, 2007

(30) Foreign Application Priority Data

Jul. 8, 2005    (JP) .............................. 2005-199662

(51) Int. Cl.
*G08B 13/14*    (2006.01)

(52) U.S. Cl. ............... 340/572.7; 340/572.1; 340/572.8; 343/741; 343/726; 343/795; 343/702

(58) Field of Classification Search ............. 340/572.7, 340/572.2, 572.8; 343/741, 726, 795, 702
See application file for complete search history.

(56) References Cited

U.S. PATENT DOCUMENTS

| | | | | |
|---|---|---|---|---|
| 6,097,347 | A * | 8/2000 | Duan et al. ................. | 343/802 |
| 6,170,924 | B1 * | 1/2001 | Nakanishi et al. ........... | 303/155 |
| 6,285,342 | B1 * | 9/2001 | Brady et al. ................ | 343/895 |
| 6,404,335 | B1 * | 6/2002 | Ohno et al. ................. | 340/505 |
| 6,603,430 | B1 * | 8/2003 | Hill et al. .................... | 343/702 |
| 6,621,467 | B1 * | 9/2003 | Marsh ......................... | 343/850 |
| 7,183,994 | B2 * | 2/2007 | Weigand ..................... | 343/795 |
| 2004/0227681 | A1 | 11/2004 | Deng | |
| 2005/0012618 | A1 * | 1/2005 | Pempsell et al. ......... | 340/572.8 |
| 2005/0052985 | A1 * | 3/2005 | Senshu et al. ............... | 369/273 |
| 2005/0179604 | A1 * | 8/2005 | Liu et al. ..................... | 343/742 |
| 2006/0010463 | A1 * | 1/2006 | Oshima et al. ............. | 720/718 |
| 2007/0200711 | A1 * | 8/2007 | Kai et al. .................. | 340/572.7 |

FOREIGN PATENT DOCUMENTS

| | | |
|---|---|---|
| EP | 0 806 808 | 11/1997 |
| EP | 0 877 439 | 11/1998 |
| EP | 0 901 182 | 3/1999 |
| WO | WO 01/84667 | 11/2001 |
| WO | PCT/JP2005/826 | 1/2005 |

OTHER PUBLICATIONS

Antenna Engineering Handbook, p. 20-22, Ohmsha, Ltd.
European Search Report dated May 2, 2006.

* cited by examiner

*Primary Examiner*—George A Bugg
*Assistant Examiner*—Son M Tang
(74) *Attorney, Agent, or Firm*—Katten Muchin Rosenman LLP

(57) ABSTRACT

The RFID tag of the present invention includes the tag antenna, and the LSI chip being connected in parallel with the tag antenna. The tag antenna includes a feeder terminal to which the LSI chip is connected, a loop antenna connected to the feeder terminal, and a bypass conductive line bypassing the loop of the loop antenna. Further, the line width of the bypass conductive line is structured thicker than the line width of the loop antenna.

9 Claims, 11 Drawing Sheets

ANTENNA AND RFID TAG MOUNTING THE SAME

CROSS-REFERENCE TO RELATED APPLICATIONS

This application is based upon and claims the benefit of priority from the prior Japanese Patent Application No. 2005-199662, filed on Jul. 8, 2005, the entire contents of which are incorporated herein by reference.

BACKGROUND OF THE INVENTION

1. Field of the Invention

The present invention relates to an antenna and a tag having the antenna mounted thereon, and more particularly, an antenna constituted of a loop antenna suitable for a non-contact tag performing transmission and reception to/from an RFID reader, and an RFID tag having the antenna mounted thereon.

2. Description of the Related Art

In recent years, introduction of a data management system has been spreading, in which a tag storing commodity information is attached to a commodity, including a living creature such as farm animal, and the information is read in a non-contact form.

A system called RF (Radio Frequency) ID system is one example of such a system. In the RFID system, a signal of approximately 1 watt is transmitted from a reader/writer, using a UHF band (860-960 MHz) radio signal.

On the tag side, based on the received signal, power for initiation is generated, and in response to the instruction information included in the signal, a response signal is returned from the tag side to the reader/writer side. With this, the reader/writer side can read information stored in the tag.

A tag attached to the commodity is constituted of an antenna and a functional chip connected to the antenna. A communication distance between the tag and the reader/writer is nearly 3 meters, though it depends on an antenna gain embedded in the tag, an operating voltage of the chip and ambient environment.

Figure 1:
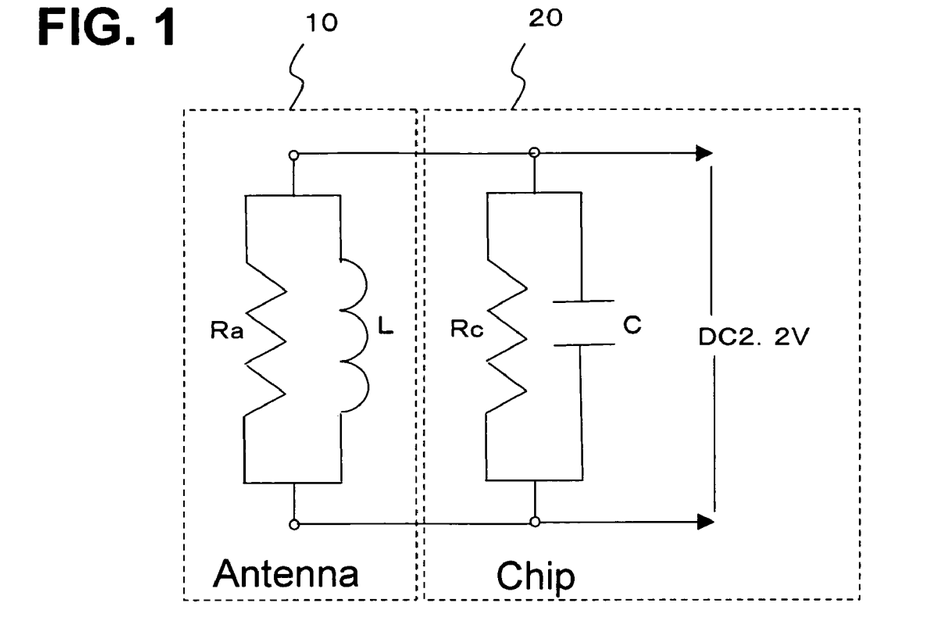
FIG. 1 shows a diagram illustrating matching between an antenna and an LSI chip.

Here, an interface section in an LSI chip 20 mounted on the tag can equivalently be represented by a parallel connection of a resistor Rc (for example, the resistance=1000 Ω) and a capacitor C (for example, the capacitance=0.7 pF), as shown in FIG. 1 in which matching between the antenna and the LSI chip is illustrated. Meanwhile, an antenna 1 mounted on the tag (which is called tag antenna) can equivalently be represented by a parallel connection of a resistor Ra (for example, the resistance=1000 Ω) and an inductor L (for example, the inductance=40 nH).

By connecting the above both connections in parallel, the capacitance C and the inductance L resonate. As can be seen from formula (1) shown below, an imaginary component becomes zero. This results in a match, and thereby the reception power in a tag antenna 10 is sufficiently supplied to the LSI chip 20 side.

$$f = 1/2\pi\sqrt{LC} \tag{1}$$

Usually, a most basic form of tag antenna 10 is a resonant dipole antenna having a total length of λ/2. In the UHF band, a necessary length is approximately 150 mm. However, when considering a case of, for example, managing a farm animal by pasting a tag onto an ear thereof, the tag must be formed with a diameter of the order of 35 mm.

However, it is hardly possible to form a λ/2 resonant dipole antenna of such a required size.

Figure 2:
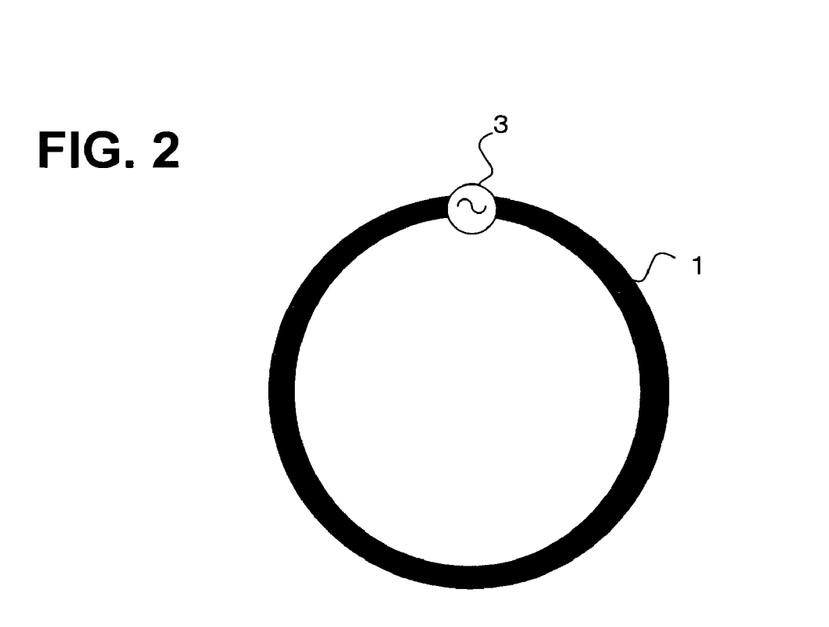
FIG. 2 shows a diagram illustrating a conventional loop antenna.

Accordingly, as shown in FIG. 2, it is considered to use a loop antenna constituted of a loop antenna 1 being connected to a feeder terminal 3. The loop antenna has a characteristic which is described in, for example, Antenna Kogaku Handbook, pp 20-22 (Kogaku means Engineering; published by Ohmsha, Ltd. on 5 Mar. 1999). Namely, it is explained that, under a condition that a unique current of an identical phase flows in the circle-shaped loop 1 being connected to feeder terminal 3, the larger the radius of the loop becomes, the more the number of robes in the power pattern increases.

Now, as described above, in a tag for use in an RFID system, the most important point in regard to matching between chip 20 and tag antenna 10 is that the capacitance C in the interface section on LSI chip 20 side and the inductance L of tag antenna 10 resonate in a use frequency, as shown in FIG. 1.

In contrast, when tag antenna 10 is structured of only a loop antenna as shown in FIG. 2, since there is no part of the inductor L such as shown in FIG. 1, matching with the interface section of LSI chip 20 cannot be made satisfactorily. As a result, power is not supplied sufficiently from tag antenna 10 to the chip 20 side. This produces an inconvenience of an extremely decreased communication distance.

Further, tag antenna 10 may be used as a unit by being housed into a dielectric case for the sake of handling convenience. Therefore, when determining the antenna shape, it is necessary to deeply consider permittivity of the dielectric for use as the case, and the thickness thereof.

SUMMARY OF THE INVENTION

Accordingly, it is an object of the present invention to provide a tag antenna with a limited size, which resonates with an LSI chip for RFID having a capacitance component, and an RFID tag mounting the above tag antenna.

In a first aspect of the antenna according to the present invention to achieve the aforementioned object, the antenna includes a feeder terminal, a loop antenna connected to the feeder terminal, and a bypass conductive line bypassing the loop of the loop antenna, in which the line width of the bypass conductive line is thicker than the line width of the loop antenna.

In a second aspect of the antenna according to the present invention to achieve the aforementioned object, in the first aspect, the linewidth of the bypass conductive line is a width producing a maximum directivity of the loop antenna in the surrounding direction.

In a third aspect of the antenna according to the present invention to achieve the aforementioned object, in the first aspect, the bypass conductive line is disposed with a distance S from the center of the loop antenna, and the magnitude of the distance S is set such that an inductor of the bypass conductive line has a predetermined inductance value.

In a fourth aspect of the antenna according to the present invention to achieve the aforementioned object, in the third aspect, the predetermined inductance value is a value resonating with the capacitance value of an interface portion in an LSI chip being connected to the feeder terminal.

As a first aspect of the RFID tag according to the present invention to achieve the aforementioned object, the RFID tag includes an antenna, and an LSI chip connected in parallel with the antenna. The antenna further includes a feeder terminal to which the LSI chip is connected; a loop antenna connected to the feeder terminal; and a bypass conductive line bypassing the loop of the loop antenna, in which the line width of the bypass conductive line is thicker than the line width of the loop antenna.

As a second aspect of the RFID tag according to the present invention to achieve the aforementioned object, in the first aspect of the RFID tag, the line width of the bypass conductive line is a width producing a maximum directivity of the loop antenna in the surrounding direction.

As a third aspect of the RFID tag according to the present invention to achieve the aforementioned object, in the first aspect of the RFID tag, the bypass conductive line is disposed with a distance S from the center of the loop antenna, and the magnitude of the distance S is set such that an inductor of the bypass conductive line has a predetermined inductance value.

As a fourth aspect of the RFID tag according to the present invention to achieve the aforementioned object, in the third aspect of the RFID tag, the predetermined inductance value is a value resonating with the capacitance value of an interface portion in an LSI chip being connected to the feeder terminal.

As a fifth aspect of the RFID tag according to the present invention to achieve the aforementioned object, in the first aspect of the RFID tag, the RFID tag further includes a dielectric plate being disposed at least on one face side of the antenna, for holding the antenna.

As a sixth aspect of the RFID tag according to the present invention to achieve the aforementioned object, in the third aspect of the RFID tag, a through hole is disposed at the center of the dielectric plate.

As a seventh aspect of the RFID tag according to the present invention to achieve the aforementioned object, in the sixth aspect of the RFID tag, the bypass conductive line includes an arc disposed along the periphery of the through hole, so as to avoid the through hole.

As an eighth aspect of the RFID tag according to the present invention to achieve the aforementioned object, in the fifth aspect of the RFID tag, the dielectric plate includes a ring-shaped groove corresponding to the loop antenna, having a width and depth at least capable of accommodating the LSI chip.

As a ninth aspect of the RFID tag according to the present invention to achieve the aforementioned object, in the fifth aspect of the RFID tag, the antenna is formed of a conductor having a principal component of Cu, Ag or Al on a sheet.

According to the present invention, it is possible to provide a tag antenna which resonates with an RFID LSI chip, having a capacitance component, within an extremely limited area of which diameter is on the order of 35 mm, and a tag mounting the tag antenna.

Further, when the diameter is made larger from approximately 35 mm to the order of, for example, 50 mm, by making the line width of a bypass conductive line wider than the line width of a loop antenna, the directivity in the direction orthogonally intersecting the surrounding direction can be weakened, and the directivity in the surrounding direction can be strengthened.

Further scopes and features of the present invention will become more apparent by the following description of the embodiments with the accompanied drawings.

DETAILED DESCRIPTION OF THE INVENTION

The preferred embodiments of the present invention are described hereinafter referring to the charts and drawings. However, it is to be noted that the description of the embodiments aims at better understanding of the present invention, and the technical scope of the invention is not limited to the embodiments described below.

[Principle of the Present Invention]

Figure 3:
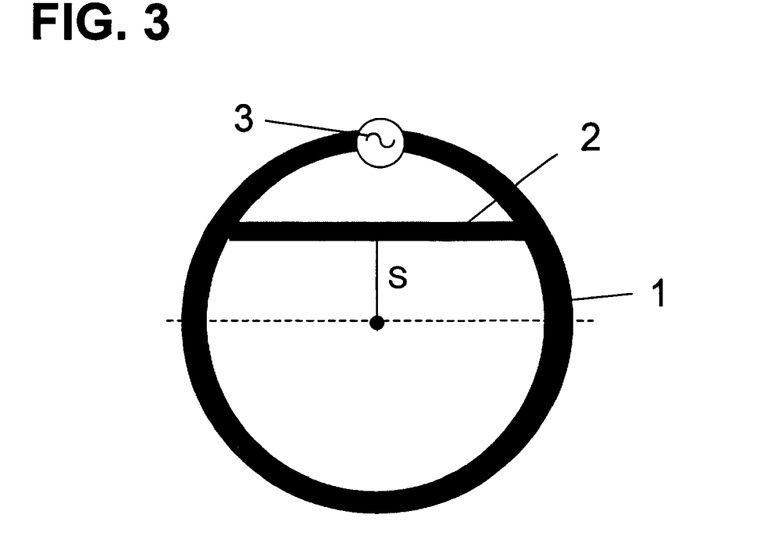
FIG. 3 shows a diagram illustrating a configuration principle of an antenna according to the present invention.

Prior to the description of the embodiments, the configuration principle of the antenna according to the present invention will be described referring to FIG. 3. In FIG. 3, a loop antenna 1 being connected to a feeder terminal 3 is formed. Further, a bypass conductive line is formed inside loop antenna 1 as a matching inductor L. Moreover, in FIG. 3, S is the distance from the center of loop antenna 1 to bypass conductive line 2 being formed. Depending on the amount of the distance S, the parameter (S) of the inductance L caused by bypass conductive line 2 varies.

Figure 4:
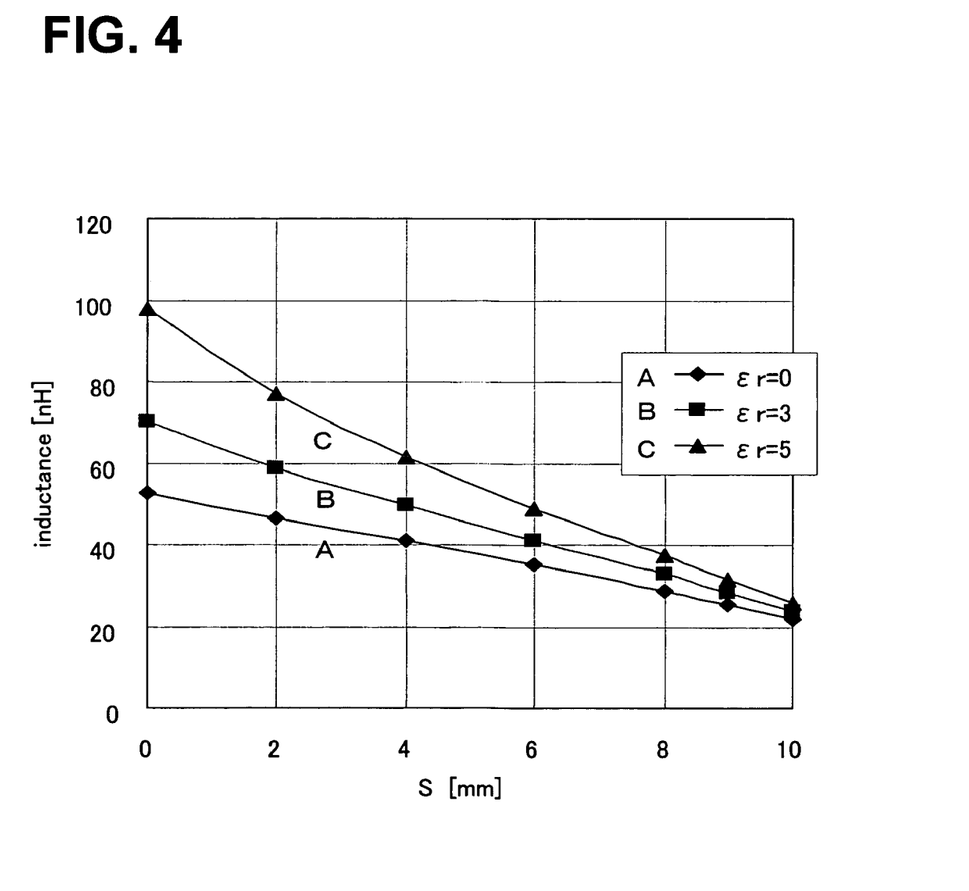
FIG. 4 shows a chart illustrating relation between an inductance L and a distance S from the center of a loop antenna 1 to a bypass conductive line 2.

FIG. 4 is a chart illustrating the relation of the inductance L with the distance S from the center of a loop antenna 1 to a bypass conductive line 2. The numeric values shown in FIG. 4 are calculated values by an electromagnetic field simulator. From this FIG. 4, it can be understood that the inductance L varies with the distance S from the center of loop antenna 1. Accordingly, by appropriately selecting the distance S, it is possible to set the inductance L of tag antenna 10 which matches the capacitance C of the interface section in LSI chip 20.

For example, when the capacitance of the capacitor C in LSI chip 20 is C=0.7 pF, from the above formula (1), resonance is produced at L=40 nH in the vicinity of f=950 MHz. In the example of FIG. 3, the permittivity of the air $\epsilon r$ (=0) is applied when the antenna is placed in the air. Therefore, to obtain L=40 nH, it can be read from the characteristic curve A in FIG. 4, that S=4.2 mm is to be set, by which matching of tag antenna 10 with LSI chip 20 can be obtained.

Additionally, through a multiple of trial products and experiments, it has been confirmed by the inventors of the present invention that the resistance value of the parallel resistance Ra of the antenna comes to approximately 1,000 Ω, in case of an outermost diameter being set to 33 mm as the size of tag antenna 10, using Cu as conductor material, a thickness of 20 μm, and a line width of 2 mm. Accordingly, even when the real part of the resistance Rc of LSI chip 20 is, for example, on the order of 1000Ω to 2,000Ω, matching can be attained sufficiently.

In FIG. 3, it is possible to hold tag antenna 10 by forming dielectric plates on the upper and lower faces of an antenna plane constituted of loop antenna 1 and bypass conductive line 2, or either one of the antenna plane faces. In this case, it is desirable to select the parameter (S), according to the permittivity of the dielectric plate(s) and the thickness thereof.

First Embodiment

Figures 5A, 5B:
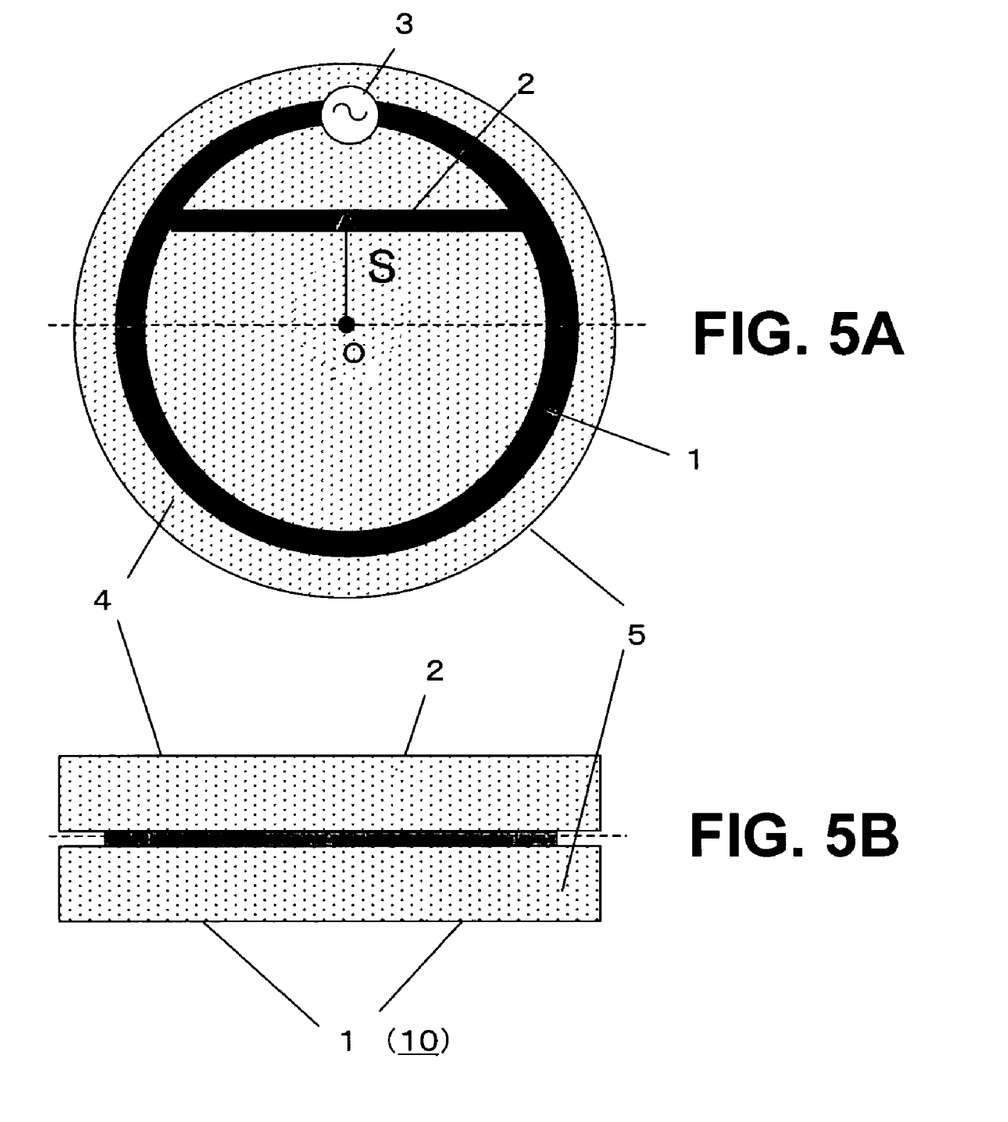
FIGS. 5A and 5B show diagrams illustrating an embodiment (a first embodiment) according to the principle of the present invention shown in FIG. 3.

FIGS. 5A, 5B show diagrams illustrating a first embodiment according to the principle of the present invention shown in FIG. 3. FIG. 5A shows a plan view, while FIG. 5B shows a central cross-sectional view.

Dielectric plates 4, 5 are disposed on the upper and lower side of the antenna plane of tag antenna 10 constituted of loop antenna 1 and bypass conductive line 2, thereby sandwiching tag antenna 10 and retaining the shape of tag antenna 10. For this purpose, dielectric plates 4, 5 are secured by a resin adhesive agent or the like, sandwiching tag antenna 10.

In this embodiment, corresponding to the principle diagram shown in FIG. 3, bypass conductive line 2 is connected from the middle of loop antenna 1 being connected to feeder terminal 3, thereby forming an inductance L component.

As to the sizes, by way of an example of the embodiment, a diameter of loop antenna 1, of which conductor material is Cu, is set to 33 mm with a thickness of 20 μm and a line width of 2 mm. Also, each thickness of dielectric plates 4, 5 is set to t=1 mm.

When each dielectric plate 4, 5 is formed of materials such as plastic and rubber, it is known that the permittivity takes a value of approximately ∈r=3 to 5. Therefore, when obtaining the characteristics using ∈r=3 and ∈r=5 through an electromagnetic field simulator, the respective characteristics are represented by characteristic curves B, C in FIG. 4.

Similar to the characteristic curve A in case of the air, the dielectric ∈r=0, the inductance L varies with the distance S, where S is a distance from a loop center O of loop antenna 1 to bypass conductive line 2. According to the calculated values obtained by the electromagnetic field simulator shown in FIG. 4, when permittivity of dielectric plates 4, 5 is ∈r=3 in the structure shown in FIGS. 5A, 5B, the characteristic curve B corresponds thereto. Also, when the permittivity is ∈r=5, the characteristic curve C corresponds thereto. Therefore, in order to resonate with L=40 nH, it is understood that S is to be set to S=6 mm in case of ∈r=3, and S=7.5 mm in case of ∈r=5, respectively.

Second Embodiment

Figure 6A:
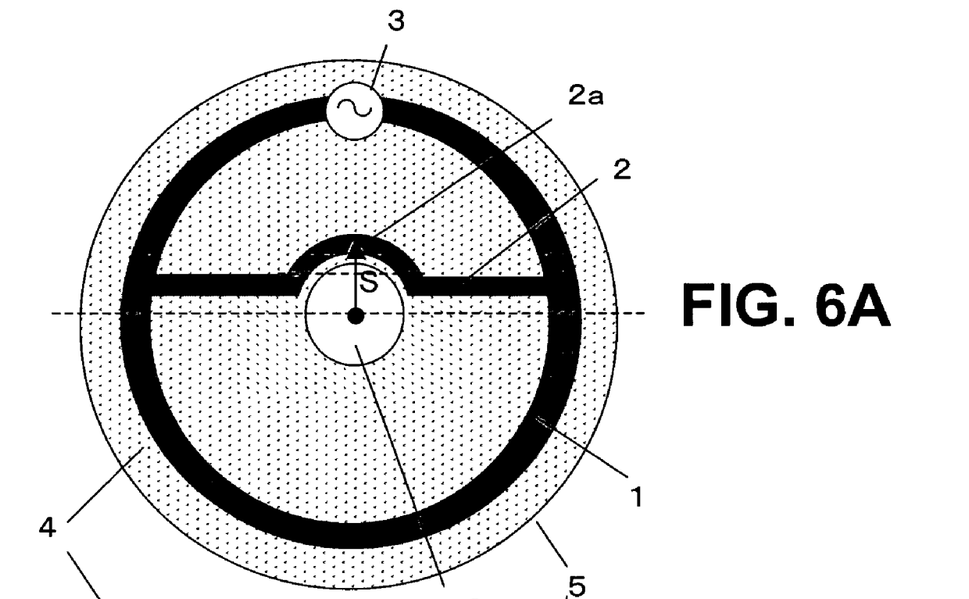
FIGS. 6A and 6B show diagrams illustrating an embodiment (a second embodiment) in which a structure of an RFID tag to attach to a commodity is taken into consideration.
Figure 6B:
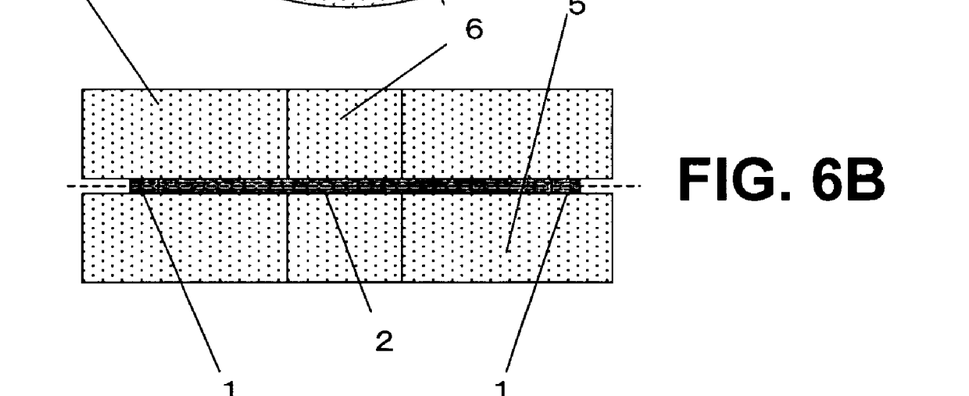

In the above example, it is necessary to consider a structure for attaching the RFID tag to a commodity. FIGS. 6A, 6B show a second embodiment to meet the above needs. A through hole 6 is formed in the central portion of an RFID tag. Using this through hole 6, the tag can be attached to a commodity.

However, through hole 6 being formed at the center of the RFID tag makes bypass conductive line 2 overlapping therewith. In the embodiment shown in FIG. 6A, in order to avoid bypass conductive line 2 from through hole 6, bypass conductive line 2 is structured with an arc 2a being formed along the periphery of through hole 6. As a result of the electromagnetic field simulation, when fixing the above arc 2a and taking the distance S to a linear conductive line portion in bypass conductive line 2 as parameter, the characteristics coincide with the characteristic curves B, C respectively corresponding to ∈r=3 and ∈r=5.

In FIG. 6, when the radius r1 of through hole 6 is 6.5 mm, the conductor width is 2 mm, and the distance S is set larger than [the radius of through hole 6+the conductor width] (that is, S>8.5 mm), in case of, for example, the chip capacitance C=0.7 pF similar to the first embodiment, from formula 1, resonance is produced at L=40 nH in the vicinity of f=950 MHz.

From FIG. 4, the distance S required to obtain L=40 nH is; S=6.1 mm in case of ∈r=3, and S=7.5 mm in case of ∈r=5. By selecting an appropriate S according to the relative permittivity, and forming the antenna having the structure shown in FIGS. 6A, 6B, it is possible to match chip 20 with antenna 10.

Third Embodiment

Figures 7A, 7B:
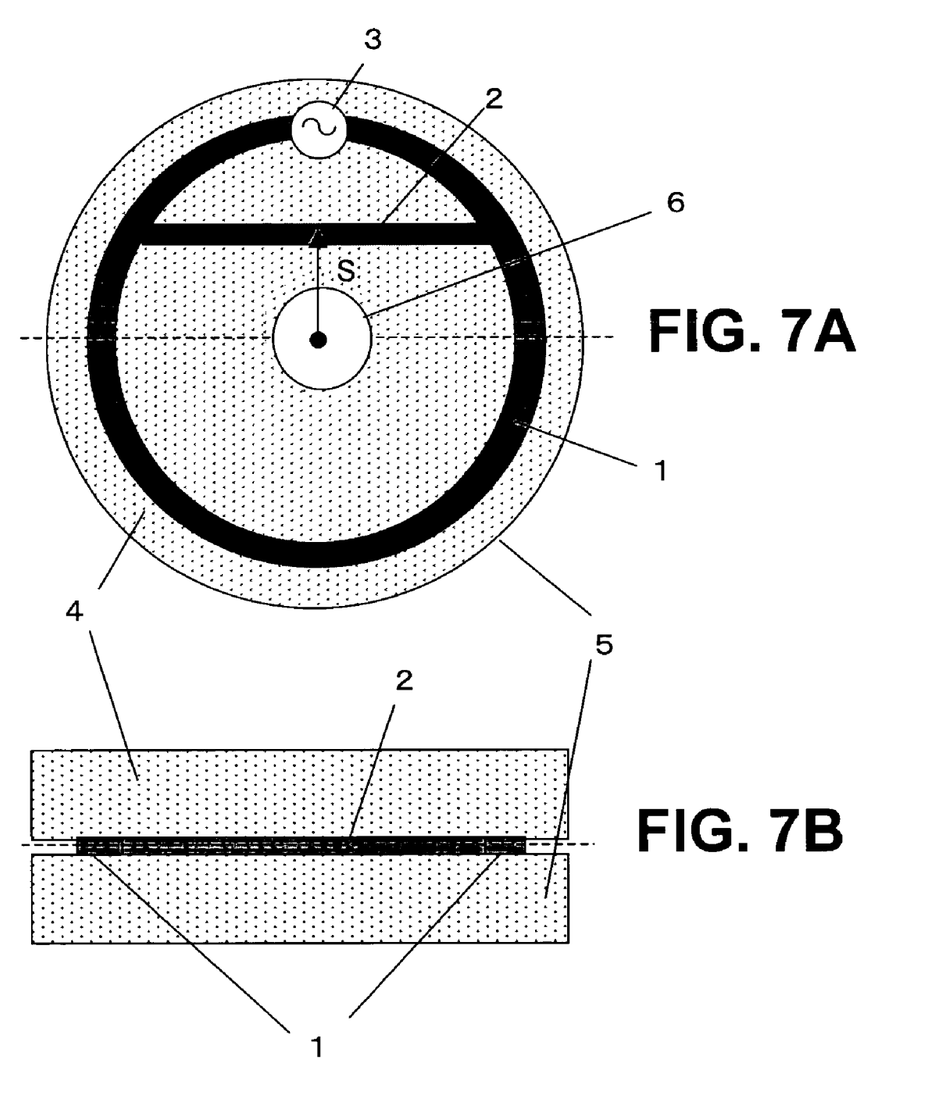
FIGS. 7A and 7B show diagrams illustrating an embodiment (a third embodiment) in which a structure of an RFID tag to attach to a commodity is taken into consideration, to the first embodiment.

FIGS. 7A, 7B show a third embodiment also having through hole 6. In contrast to the structure of the first embodiment shown in FIGS. 5A, 5B, by making the radius of through hole 6 smaller than the distance S from the center of loop antenna 1 to bypass conductive line 2, it becomes possible to have a structure without providing arc 2a shown in FIG. 6A.

Fourth Embodiment

Figures 8A, 8B, 8C:
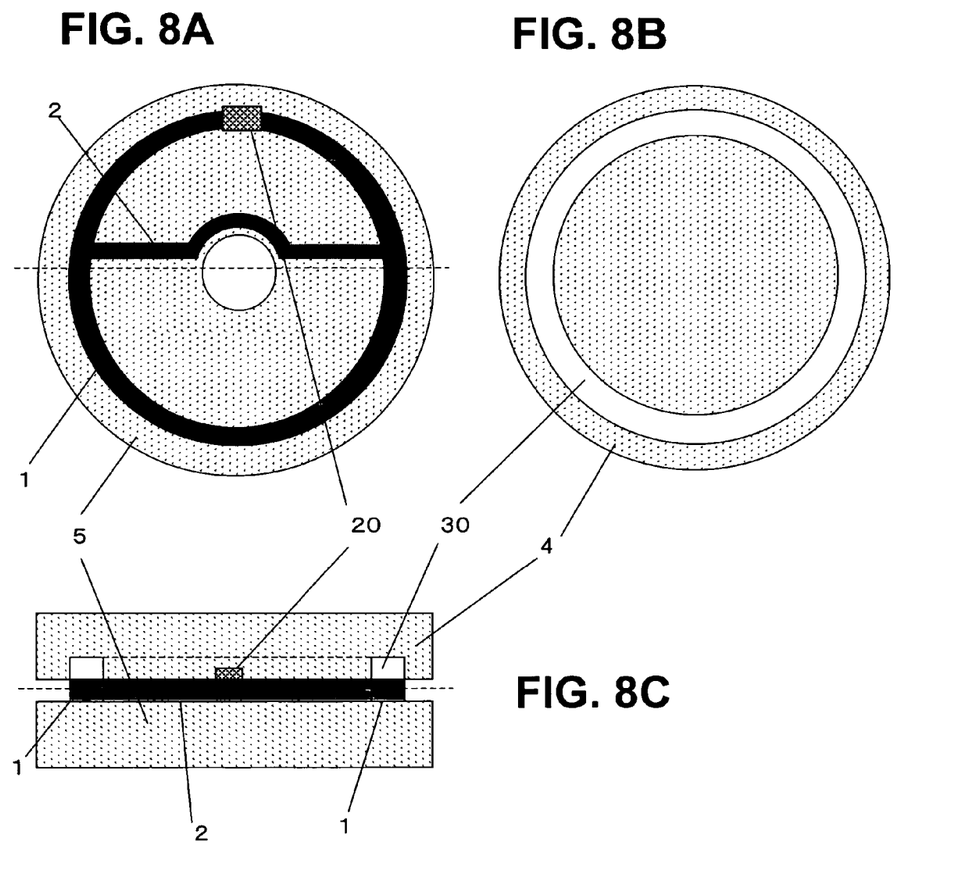
FIGS. 8A, 8B and 8C show an embodiment (a fourth embodiment) for structuring an LSI chip and a tag antenna in integration.

In the above embodiment, preferably LSI chip 20 is structured integrally with tag antenna 10. FIGS. 8A, 8B show a fourth embodiment to meet the above needs.

In FIG. 8A, LSI chip 20 is connected to a feeder terminal of tag antenna 10 constituted of loop antenna 1 and bypass conductive line 2, each corresponding to FIG. 6A. FIG. 8A is a diagram of tag antenna 10 and LSI chip 20 mounted on a dielectric plate 5.

Meanwhile, FIG. 8B shows a dielectric plate 4, which has a feature that a ring-shaped groove 30 is provided corresponding to loop antenna 1. Groove 30 has a width and a depth capable of accommodating LSI chip 20 having a chip thickness of at least 0.5 mm or so. Accordingly, by overlaying dielectric plate 5, tag antenna 10, being connected to LSI chip 20, and dielectric plate in that order, an integral structure as shown in FIG. 8C can be obtained.

As a feature, wherever LSI chip 20 is positioned at the time of overlaying, because of groove 30, a space capable of accepting LSI chip 20 can be secured on dielectric plate 4. Therefore, the upper and lower dielectric plates 4, 5 can be pasted exactly each other. With this, it becomes possible to reduce an amount of work when sandwiching tag antenna 10 between the upper and lower dielectric plates 4, 5, enabling supply of an antenna unit at low cost.

Fifth Embodiment

Figures 9A, 9B:
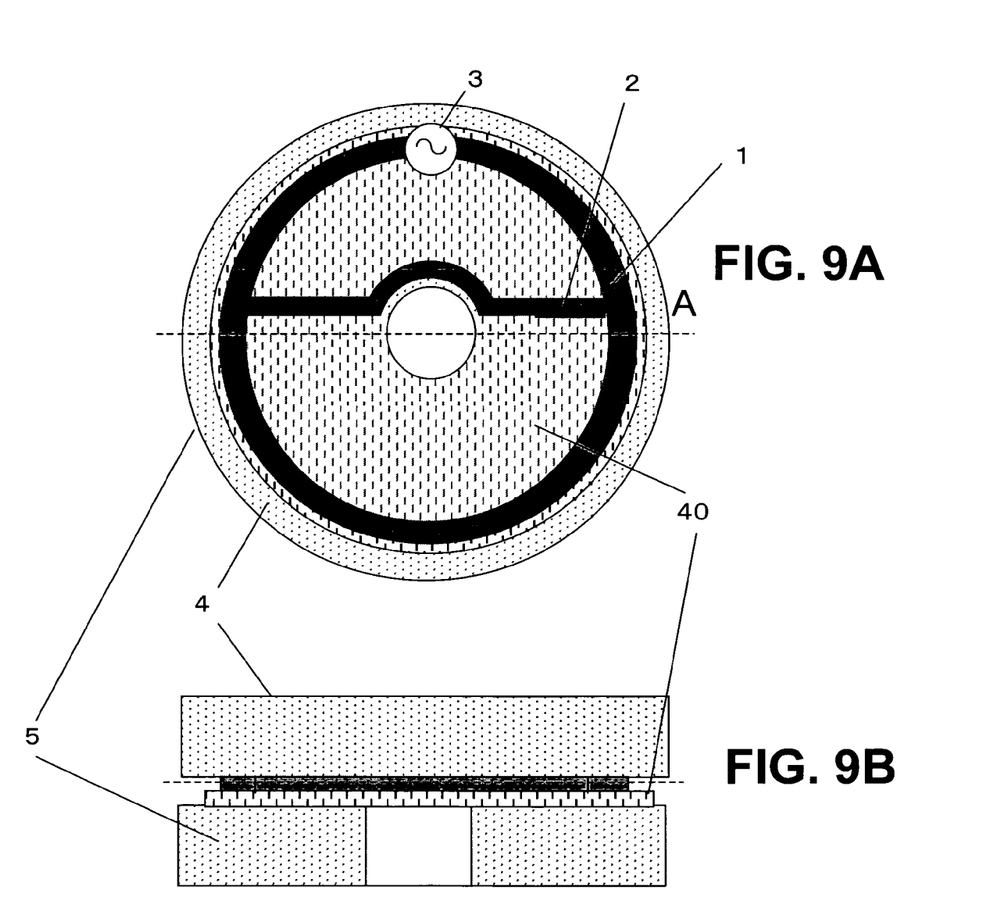
FIGS. 9A and 9B show diagrams illustrating still another embodiment (a fifth embodiment).

FIGS. 9A, 9B show a fifth embodiment. In each aforementioned embodiment, as a manufacturing method of tag antenna 10 constituted of loop antenna 1 and bypass conductive line 2, it is possible to manufacture using a thin conductor of Cu, Ag, Al, etc. (of which thickness is, for example, 20 μm) to be formed on an extremely thin sheet 40 (for example, 0.1 mm thick) which is made of paper, PET (polyethylene sheet), or the like. Or, in place of the thin conductor, a wire-shaped conductive line may be used.

Sixth Embodiment

Figures 10A, 10B:
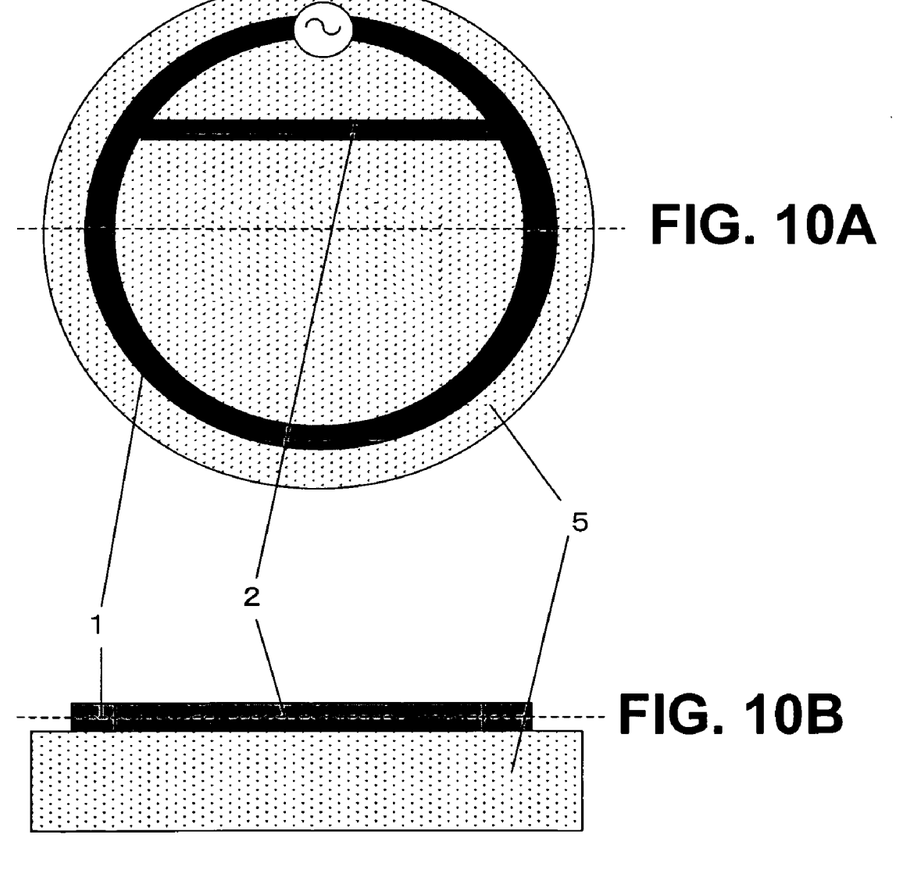
FIGS. 10A and 10B show diagrams illustrating an embodiment (a sixth embodiment) in which a dielectric is formed on one side of the tag antenna.

Further, in each aforementioned embodiment, there has been shown a structure of tag antenna 10 constituted of loop antenna 1 and bypass conductive line 2, being sandwiched between dielectric plates 4, 5. As a sixth embodiment shown in FIG. 10, from the viewpoint of holding tag antenna 10, it may also be possible to form dielectric plate 4 (5) on only one side of tag antenna 10.

Figure 11A:
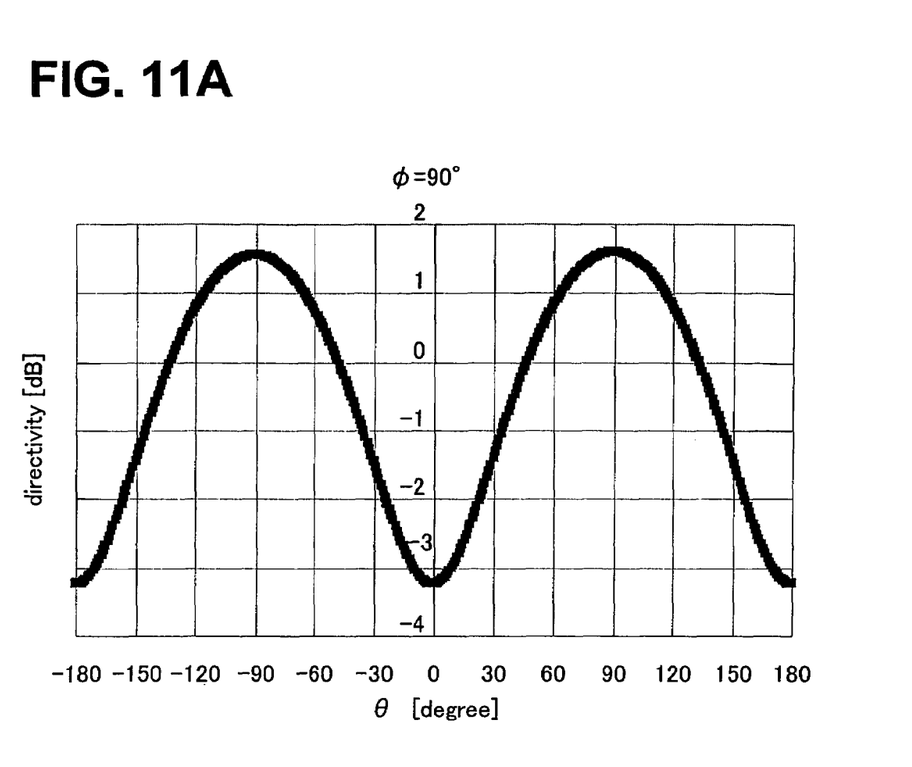
FIGS. 11A and 11B show disaster illustrating an antenna directivity characteristic obtained through an electromagnetic field simulation according to the present invention.
Figure 11B:
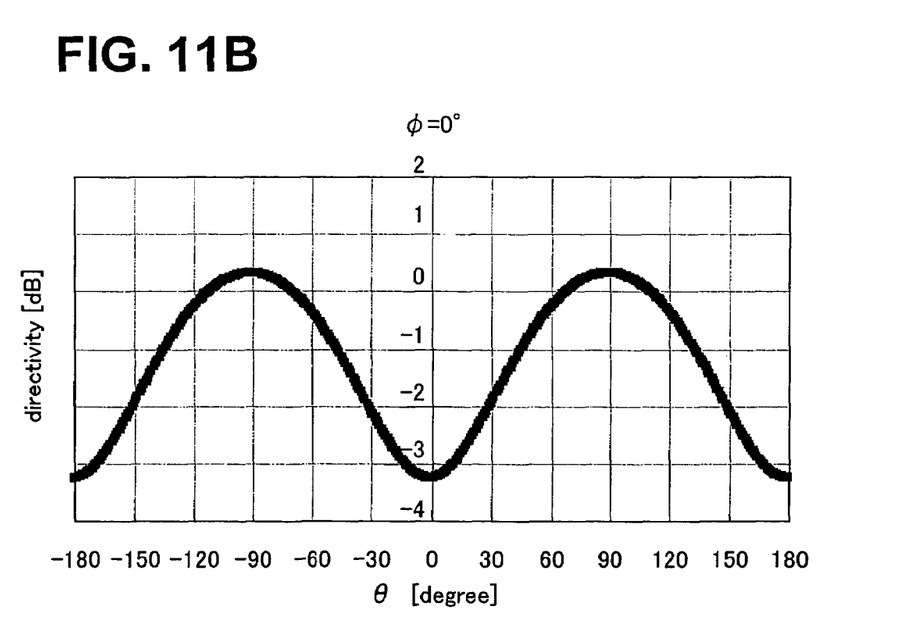
Figure 12:
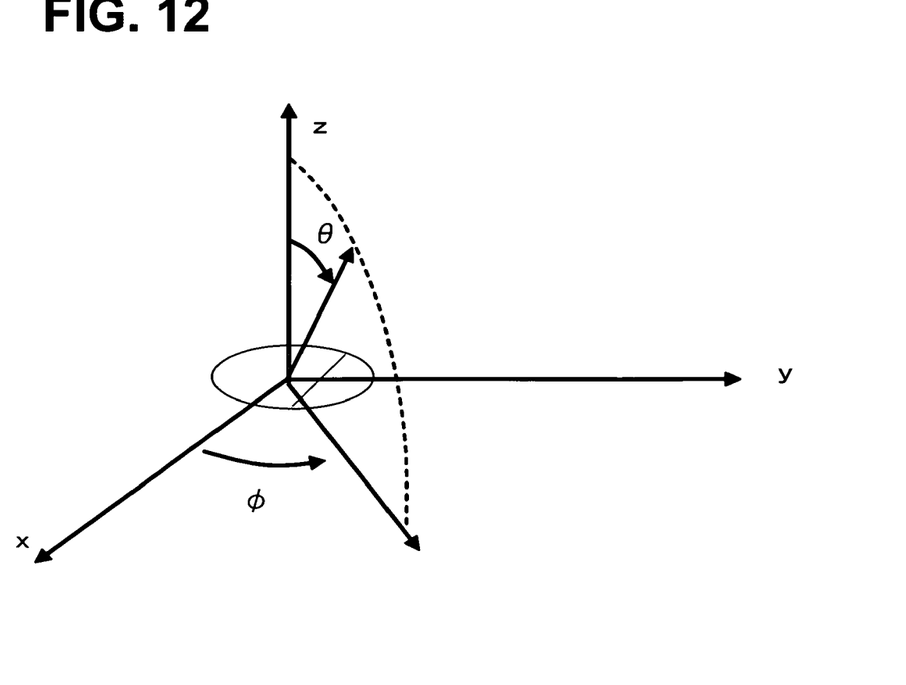
FIG. 12 shows diagrams illustrating definitions of three axis directions x, y, z in FIG. 11.

FIGS. 11A, 11B show a diagram illustrating an antenna directivity characteristic obtained through an electromagnetic field simulation of the antenna according to the present invention. Three axial directions x, y and z are defined as shown in FIG. 12. Further, an angle from the x-axis in the x-y plane is defined as $\phi$, and an angle from the z-axis is defined as $\theta$.

It is indicated from FIG. 11A that, when $\phi=90°$, namely in the y-axis direction, the maximum directivity characteristic is provided when the angle $\theta$ from the z-axis is 90° and −90°. Also, it is indicated from FIG. 11B that, when $\phi=0°$, namely in the x-axis direction, the maximum directivity characteristic is provided when the angle $\theta$ from the z-axis is 90° and −90°. FIGS. 11A, 11B represent the same directivity characteristic on the whole. However, the directivity directs stronger in $\theta=90°$ (FIG. 11A) than in $\theta=0$ (FIG. 11B), in which a result particular to the loop antenna is obtained.

Accordingly, from the above directivities, it can be understood that the antenna according to the present invention has a desirable directivity characteristic. Therefore, when an RFID tag having the antenna of the present invention is used as RFID tag for commodities, the RFID tag may be applied to moving commodities such as animals, and has a wide application scope. According to the present invention, it becomes possible to supply a tag antenna resonating with an RFID LSI chip having a capacitance component, and an RFID tag having the tag antenna mounted thereon within an extremely limited area of which diameter is as small as 35 mm.

Further, according to the present invention, it is easily possible to determine optimal sizes according to the layout of a bypass conductive line constituting an inductor having an inductance L calculated in advance, resonating with a capacitance C of the interface section in the LSI chip, the permittivity of a dielectric plate and the thickness thereof.

Further, in the manufacturing process, it is easily possible to overlay upper and lower dielectric plates, wherever the LSI chip is positioned.

Seventh Embodiment

In each aforementioned embodiment, there has been shown an exemplary case of loop antenna 1 having a diameter of 33 mm, a thickness of 20 μm, and a line width of 2 mm, as each size of tag antenna 10. The above diameter of 33 mm is suitable for, for example, attaching the RFID tag to a pig ear. When a broader space can be secured as an attachment portion of tag antenna 10, by making the diameter of loop antenna 1 larger, a larger gain can be obtained, enabling a longer communication distance. Here, when the loop antenna diameter is made larger, the following problem arises.

Namely, by making the diameter of loop antenna 1 larger, a curvature of the loop antenna becomes smaller, and a degree of approximation of loop antenna 1 to a line increases. With both bypass conductive line 2 and the line portion of loop antenna 1 having a narrower space to bypass conductive line 2, a structure similar to a dipole antenna is constituted. With this, the directivity of the dipole antenna is strengthened, and the directivity in the x-axis direction in FIG. 12, i.e. the surrounding direction is weakened, while the directivity in the z-axis direction orthogonally intersecting the surrounding direction (direction of the x-y plane) is strengthened. In other words, although the loop antenna gain becomes larger as a whole, the directivity in the surrounding direction intrinsically provided in the loop antenna is weakened. This produces a problem of reduced communication distance in the surrounding direction.

According to the seventh embodiment, the above-mentioned problem is solved by making the line width of bypass conductive line 2 thicker than the line width of loop antenna 1.

Figure 13:
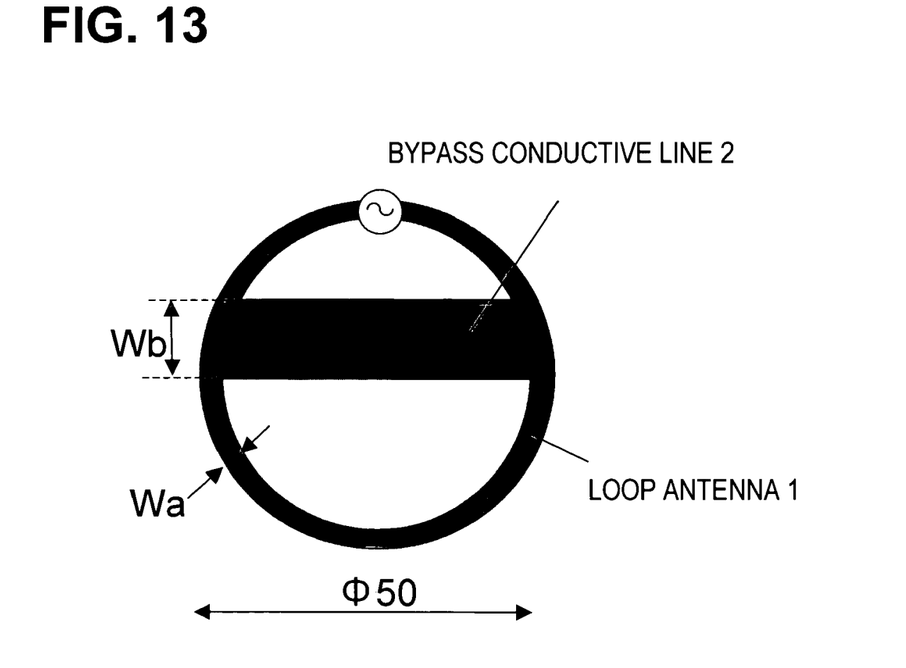
FIG. 13 shows a diagram illustrating an embodiment (a seventh embodiment) in which the line width of a bypass conductive line is made thicker than the line width of a loop antenna.

FIG. 13 shows a diagram illustrating the seventh embodiment. The sizes of tag antenna 10 are, by way of example, the diameter of loop antenna 1 is 50 mm, the line width is 5 mm, and the thickness is 20 μm, while the line width of bypass conductive line 2 is 20 mm with the thickness of 20 μm. Namely, in the seventh embodiment, by making the line width Wb of bypass conductive line 2 thicker than the line width Wa of loop antenna 1, the current density flowing in bypass conductive line 2 is reduced, thereby weakening the effectiveness (directivity) of the approximate dipole antenna. This strengthens directivity of the loop antenna which is intrinsically provided in the surrounding direction. Even when the diameter of loop antenna 1 is made larger, the directivity in the surrounding direction can be maintained, and thus the communication distance can be kept long.

For example, when considering a case such that tag antennas are attached to the rear faces of dishes, and a plurality of dishes are overlaid one after another, each tag antenna is disposed mutually closely in the z-axis direction. In such a situation, if the directivity is strong in the direction orthogonally intersecting the surrounding direction of each tag antenna (i.e. in the z-axis direction), radiation from each tag antenna mutually interferes in the z-axis direction, which may cause reduction of the gain in tag antennas as a whole. As a result, communication distance in the surrounding direction may also be decreased. However, using the tag antenna according to the present invention, the directivity in the direction orthogonally intersecting the surrounding direction can be reduced sufficiently. As a result, even in a situation such that tag antennas are overlaid for a plurality of sheets, the directivity in the surrounding direction can be secured to the maximum extent.

Figure 14A:
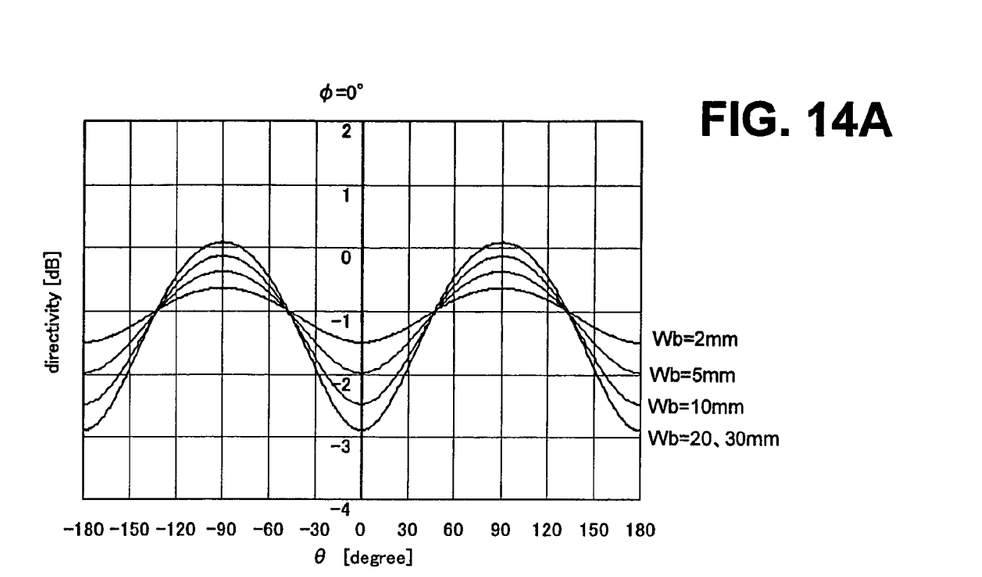
FIGS. 14A and 14B show an antenna directivity characteristic obtained through an electromagnetic field simulation with varied line widths of the bypass conductive line.
Figure 14B:
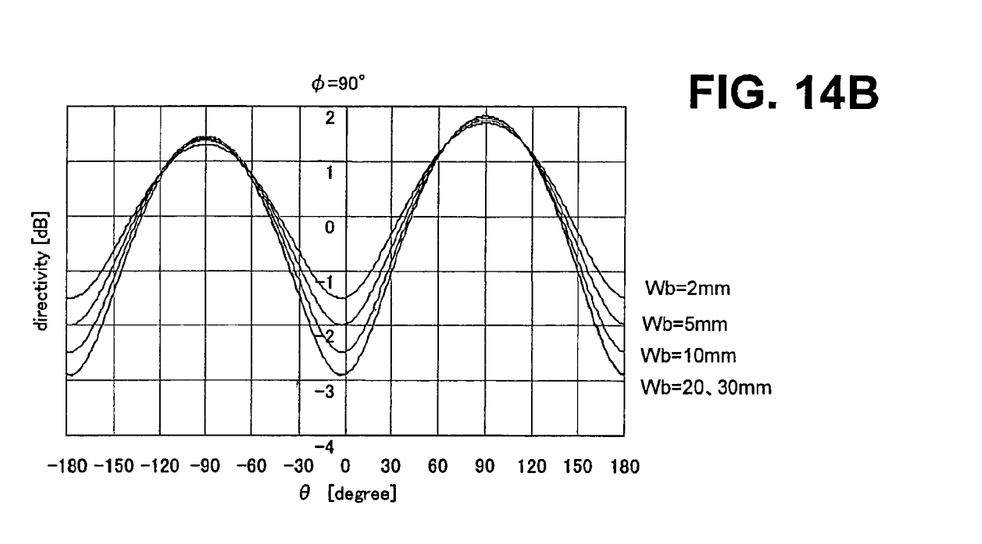

FIGS. 14A, 14B are diagrams illustrating antenna directivity characteristics obtained through the electromagnetic field simulation of an antenna according to the seventh embodiment. Similar to FIG. 12, the directions of three axes x, y, z are defined, as shown in the figure, and also an angle from the x-axis in the x-y plane is defined as $\phi$, and an angle from the z-axis is defined as $\theta$.

In both cases of $\phi=0°$ in FIG. 14A and $\phi=90°$ in FIG. 14B, the maximum directivity is obtained in the direction of an angle $\theta$ of 90° and −90° from the z-axis, namely in the surrounding direction including the x-axis and the y-axis directions. It is indicated that, as the line width Wb of bypass conductive line 2 becomes thicker, the directivity in the surrounding direction is strengthened. Here, in the cases of the line width of bypass conductive line 2 being 20 mm and 30 mm, the directivity in both cases is substantially the same. It can also be known that the directivity reaches a saturated state at the line width of 20 mm. Accordingly, from the above simulation results, in case that the diameter of loop antenna 1 is 50 mm, and the line width thereof is 5 mm, the optimal value of the line width Wb of bypass conductive line 2 is of the order of 20 mm.

When the diameter of loop antenna 1 is to set still larger, it may be possible to obtain an optimal line width of bypass conductive line 2 producing the maximum directivity in the surrounding direction, based on, for example, the electromagnetic field simulation as shown in FIGS. 14A, 14B. Additionally, the structure shown in the seventh embodiment may also be applied in the aforementioned first through sixth embodiments.

The foregoing description of the embodiments is not intended to limit the invention to the particular details of the examples illustrated. Any suitable modification and equivalents may be resorted to the scope of the invention. All features and advantages of the invention which fall within the scope of the invention are covered by the appended claims.

What is claimed is:

1. An antenna comprising:
   a feeder terminal;
   a loop antenna connected to the feeder terminal; and
   a bypass conductive line bypassing the loop of the loop antenna, wherein the line width of the bypass conductive line is thicker than the line width of the loop antenna, is a width producing a maximum directivity of the loop antenna in the surrounding direction, and is disposed a distance S from the center of the loop antenna, wherein the magnitude of the distance S is set such that an inductor of the bypass conductive line has a predetermined inductance value.

2. The antenna according to claim 1, wherein the predetermined inductance value is a value resonating with a capacitance value of an interface portion in an LSI chip being connected to the feeder terminal.

3. An RFID tag comprising:
   an antenna; and
   an LSI chip connected in parallel with the antenna, wherein the antenna further comprises:
   a feeder terminal to which the LSI chip is connected;
   a loop antenna connected to the feeder terminal; and
   a bypass conductive line bypassing the loop of the loop antenna, wherein the line width of the bypass conductive line is thicker than the line width of the loop antenna, is a width producing a maximum directivity of the loop antenna in the surrounding direction, and is disposed a distance S from the center of the loop antenna, wherein the magnitude of the distance S is set such that an inductor of the bypass conductive line has a predetermined inductance value.

4. The RFID tag according to claim 3, wherein the predetermined inductance value is a value resonating with a capacitance value of an interface portion in an LSI chip being connected to the feeder terminal.

5. The RFID tag according to claim 3, further comprising: a dielectric plate being disposed at least on one face side of the antenna, for holding the antenna.

6. The RFID tag according to claim 3, wherein a through hole is disposed at the center of a dielectric plate.

7. The RFID tag according to claim 6, wherein the bypass conductive line includes an arc disposed along the periphery of the through hole, so as to avoid the through hole.

8. The RFID tag according to claim 5, wherein the dielectric plate includes a ring-shaped groove corresponding to the loop antenna, having a width and depth at least capable of accommodating the LSI chip.

9. The RFID tag according to claim 5, wherein the antenna is formed of a conductor having a principal component of Cu, Ag or Al on a sheet.

* * * * *